United States Patent [19]
Chung

[11] Patent Number: 5,611,256
[45] Date of Patent: Mar. 18, 1997

[54] DIFFERENTIAL PRESSURE DETECTING SYSTEM

[76] Inventor: Chang S. Chung, 11F, No. 37-1, Alley 57, Lane 38, Yeong Yueh Street, Lu Jou Hsiang, Taipei Hsien, Taiwan

[21] Appl. No.: 567,593

[22] Filed: Dec. 5, 1995

[51] Int. Cl.⁶ .................... F01B 25/26; F01B 31/12; F15B 15/22
[52] U.S. Cl. ............................................ 91/1; 91/401
[58] Field of Search .................... 91/1, 394, 396, 91/400, 401, 404, 408, 409

[56] References Cited

U.S. PATENT DOCUMENTS

| | | | |
|---|---|---|---|
| 2,543,109 | 2/1951 | Holowka | 91/400 X |
| 2,784,704 | 3/1957 | Meats | 91/401 |
| 2,839,032 | 6/1958 | Reynolds | 91/401 |
| 3,118,349 | 1/1964 | Combs | 91/401 X |
| 3,410,180 | 11/1968 | Spangler et al. | 91/404 |
| 3,831,379 | 8/1974 | Lixenfeld et al. | 91/401 X |
| 4,240,326 | 12/1980 | Carle | 91/401 X |
| 4,240,620 | 12/1980 | Tunkers | 91/401 X |
| 4,337,687 | 7/1982 | Hoover | 91/401 |
| 4,407,150 | 10/1983 | Kelly | 91/400 X |
| 4,470,280 | 9/1984 | Kelly | 91/400 X |

FOREIGN PATENT DOCUMENTS 2437320  2/1976  Germany ................... 91/400

*Primary Examiner*—John E. Ryznic
*Attorney, Agent, or Firm*—Pro-Techtor International

[57] ABSTRACT

The main feature of the differential pressure detecting system of the present invention resides in that, when a mechanical arm is to clamp a workpiece, a differential pressure can be produced for operating a cylinder and in turn triggering a responsive switch to activate a display device; when it clamps the workpiece, the differential pressure still exists for maintaining the said activating, when it clamps nothing, the cylinder will be restored and in turn turn off the responsive switch to turn off the display device.

15 Claims, 3 Drawing Sheets

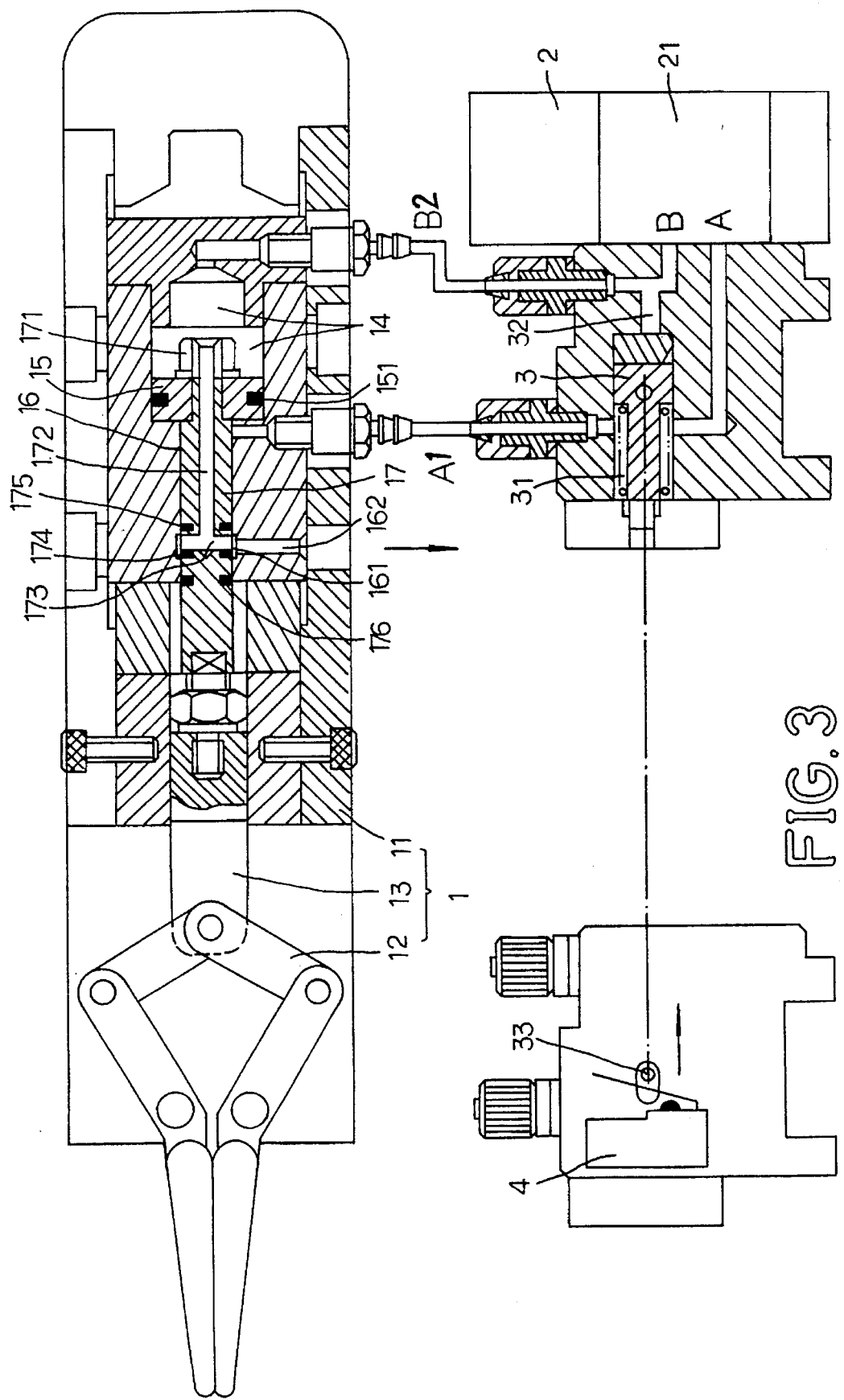

DIFFERENTIAL PRESSURE DETECTING SYSTEM

BACKGROUND OF THE INVENTION

1. Field of the Invention

The present invention is related to a differential pressure detecting system, and especially to one which is used on a mechanical arm for recognizing getting clamping or not of an object or workpiece.

2. Description of the Prior Art

A mechanical arm now used in an area which is subjected to explosion, pollution of dirt or damp normally has a high ratio of failure, it is always stranded in view of its limitation in operation as well as in application.

SUMMARY OF THE INVENTION

The main object of the present invention is to provide a differential pressure detecting system wherein a responsive switch can be provided far away from a working place, while operation and using of the mechanical arm can avoid being subjected to influence of the working place and its environment. Therefore, the present invention has the advantage of being reliably used in an area which is subjected to explosion, pollution of dirt or damp.

For this object, the present invention includes: an air supply which is provided with an electromagnetic valve for choosing an air supplying hole A or an air supplying hole B; a mechanical arm which is provided with a clamp on one end and with a housing on the other end, while in the housing, there is a movable link for effecting "opening" or "closing" of the clamp, a piston room is provided closely behind the housing for moving of a piston, there are an inlet A1 and an inlet B2 in the piston room, by air supplying of the inlet A1 or the inlet B2, the piston can be moved backward or forward, the present invention is characterized in that, in the housing, a passage is provided at the rear of the link of the clamp, a valve body is provided in the passage and is movable therein, the front part of the valve body is connected with the link, while the rear part of the valve body is provided axially with an air way, yet a through hole extending radially outwardly is provided on the end of the air way, the rear part of the valve is connected with the piston and extended through the piston to allow communication between the passage and the piston room; wherein the air supplying hole A is connected with the inlet A1, and the air supplying hole B is connected with the inlet B2 and a cylinder, the piston can be moved leftward or rightward in the piston room by air flow supplied by the air supplying hole A or the air supplying hole B, the air flow also renders the valve body to move in the passage for activating the link to "open" or "close" the clamp, The differential pressure detecting system of the present invention is characterized by that a through hole extending radially outwardly is provided at the end of the passage of the valve body, and a discharge port extends outwardly from the central position of the passage in the housing to communicate with the atmosphere for associate moving of the cylinder and the responsive switch; when the clamp on the mechanical arm initially is in a successfully clamping state, air pressure supplied through the air supplying hole B is in a normal (constant) value of pressure which is enough for pushing the cylinder, and in turn moving the responsive switch to render the responsive switch to activate a displaying device; if the clamp fails to clamp, the through hole of the valve body will reach the discharge port of the passage in the housing, to render the supplied air from the air supplying hole B to be released outwardly, and to turn off the displaying device, we can see from the displaying device the "failed clamping" operation.

The present invention will be apparent in its practical characteristics and functions after reading the detailed description of the preferred embodiment thereof in reference to the accompanying drawings, wherein:

BRIEF DESCRIPTION OF THE DRAWINGS

FIG. 3 is a sectional view of the preferred embodiment of the present invention showing its failure in clamping an object;

DETAILED DESCRIPTION OF THE PREFERRED EMBODIMENT

Figure 1:
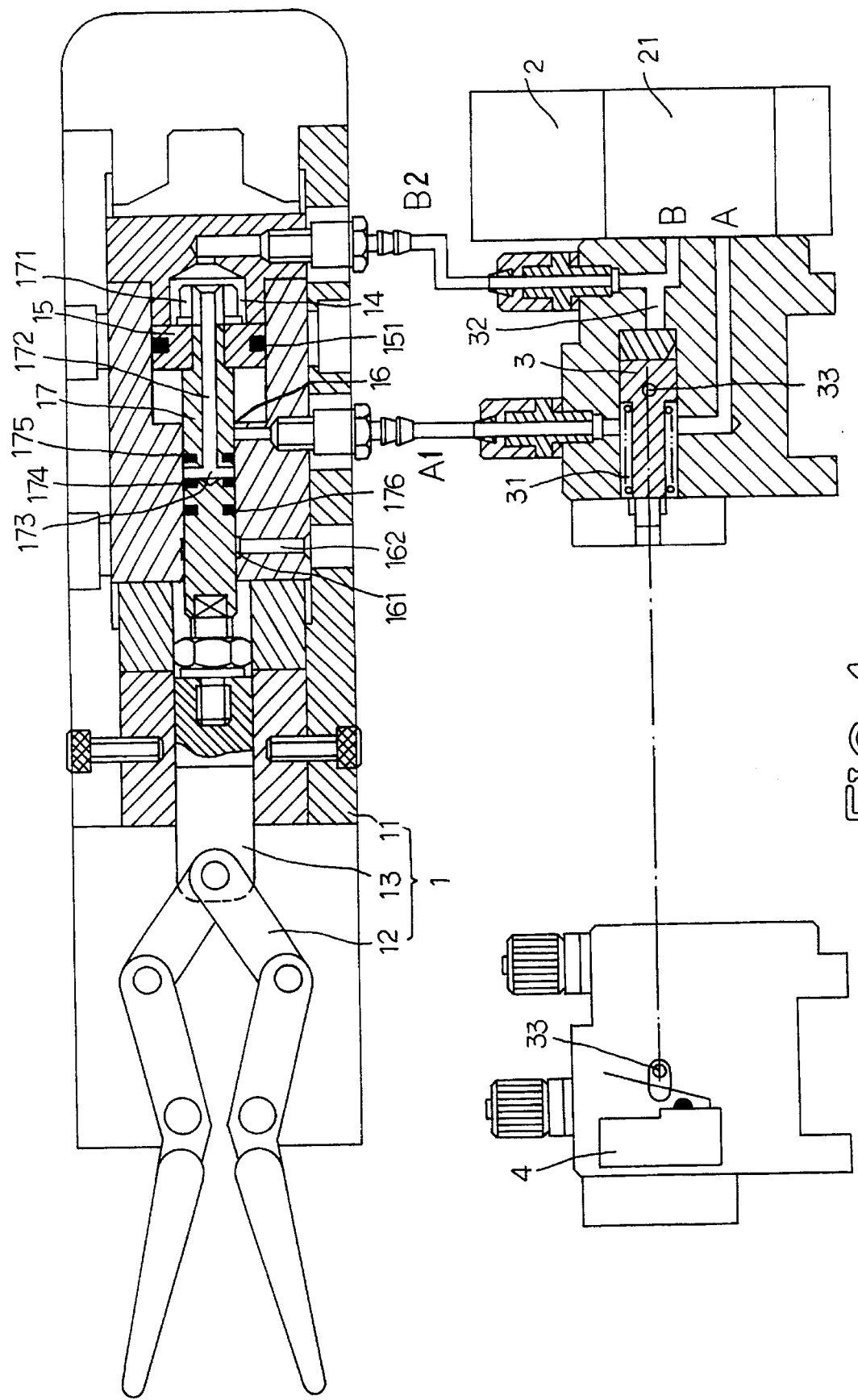
FIG. 1 is a sectional view of the preferred embodiment of the present invention in an initial state.

Referring to the drawings, the present invention is comprised of a mechanical arm 1, an air supply 2, a cylinder 3 and a responsive switch 4, wherein:

The mechanical arm 1 includes a housing 11 and a clamp 12 on the front end of the housing 11, a movable link 13 connecting with the clamp 12 is provided near the front end of the housing 11, movement of the link 13 will effect "opening" or "closing" of the clamp 12, a piston room 14 is provided closely behind the housing 11 and has a piston 15 therein, an oil seal 151 is provided on the exterior periphery of the piston 15, an inlet B2 is provided at an appropriate position at the rear of the piston room 14, an inlet A1 is provided at an appropriate position at the front of the piston room 14, while a passage 16 is provided between the link 13 and the piston room 14, a valve body 17 is provided in the passage 16, one side of the valve body 17 is connected with the link 13, while the other side thereof extends through the piston 15 and is fixedly combined with the the piston 15 by using a nut 171, the rear section of the valve body 17 is provided axially with an air way 172, yet a through hole 173 extending radially outwardly is provided on the end of the air way 172 which is communicated with the piston room 14; besides, an annular groove 161 is provided around the central position of the passage 16 of the housing 11, a discharge port 162 communicating with the atmosphere is extended outwardly from the annular groove 161; further, an oil seal 174 and an oil seal 175 is provided respectively on each side of the through hole 173, and an oil seal 176 is provided at an appropriate position in front (on the left) of the oil seal 174.

The air supply 2 is a source of air for the inlet A1 and the inlet B2, and is provided with an electromagnetic valve 21 for choosing between an air supplying hole A and an air supplying hole B, wherein the air supplying hole A is connected with the inlet A1, while the air supplying hole B is connected with the inlet B2.

The cylinder 3 is provided with an elastically restorable spring 31, when the cylinder 3 is not subjected to air pressure, because of the pre-existed pressure of the spring 31, the cylinder 3 is constantly maintained in a "non operated" state, besides, a triggering rod 33 is provided outside of the cylinder 3 and is movable along with the cylinder column, yet an air supplying pipe 32 of the cylinder 3 is connected to the air supplying hole B.

Further, the responsive switch 4 of the present invention can be, in addition to the limited switch as shown in the drawings or the embodiment of the present invention, alternatively a photoelectric switch or another suitable switch; the principal requirement is that it should be kept in association with motion of the cylinder 3; i.e., it can be pushed by the triggering rod 33, by using the limited switch or other responsive switch 4, the display device (not shown) or other control system can be driven.

Referring to FIG. 1, it is shown therein an initial state of the present invention, the air supplying hole A is used to supply air pressure for the inlet A1, thus to move the piston 15 backwardly and inturn render the valve body 17 to move backwardly, this may render the link 13 to pull the clamp 12 to open, meantime, the through hole 173 of the valve body 17 is constantly kept behind the discharge port 162 of the passage 16, so that the air pressure in the passage 16 will be kept unreleased.

Figure 2:
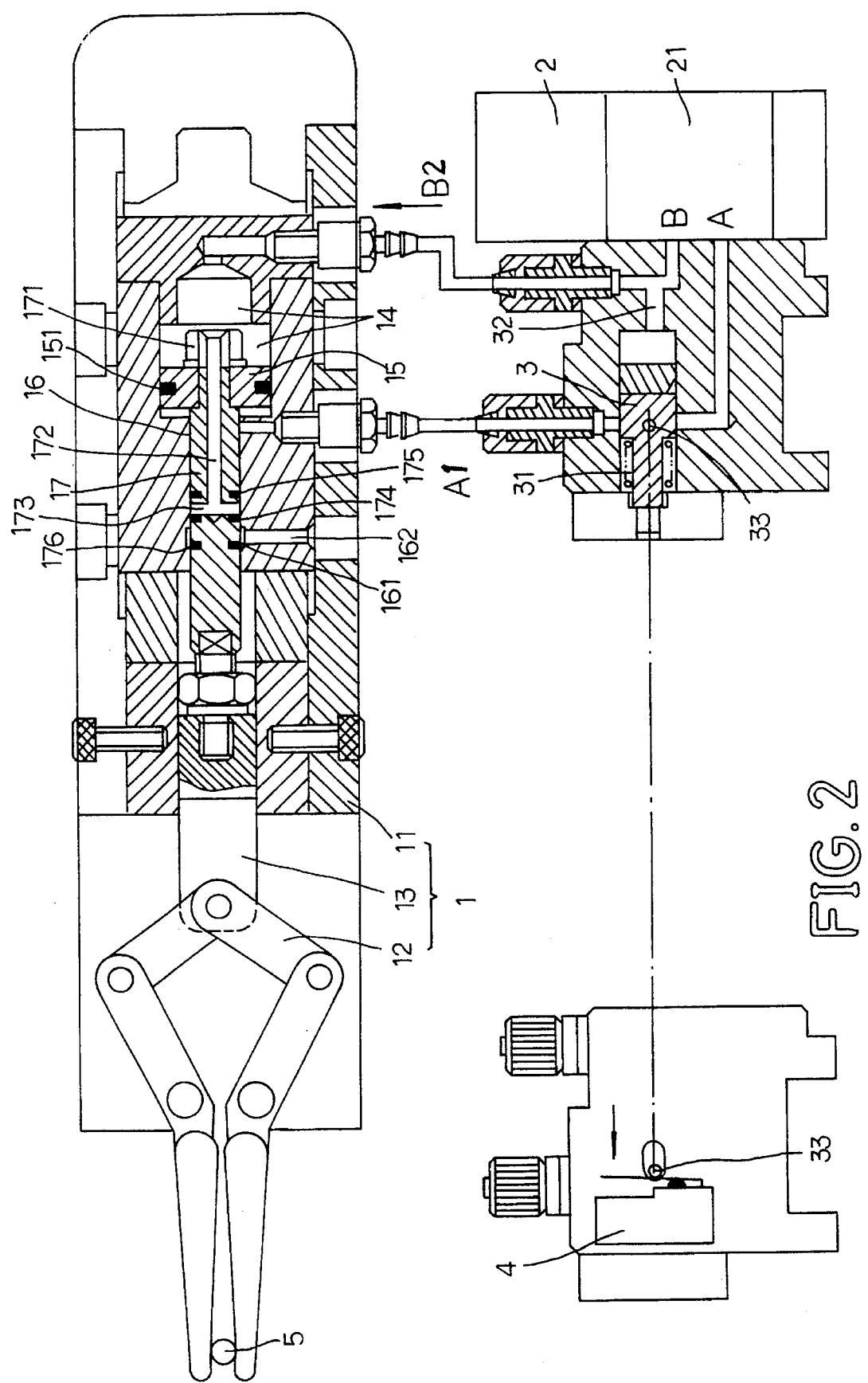
FIG. 2 is a sectional view of the preferred embodiment of the present invention showing its success in clamping an object.

Referring to FIG. 2, it is shown therein a state of the present invention expressing its success in clamping an object, wherein, the air supplying hole B supplies air pressure for the inlet B2 to push forward the piston 15, and inturn push forward the valve body 17 to render the link 13 to push forward the clamp 12 to clamp an object 5, because of the thickness of the object 5, forward moving of the valve body 17 is not enough to render the through hole 173 to reach or move and pass over the discharge port 162, the air supplying hole B always supplies constant air pressure, therefore, air pressure from the air supplying hole B moves the cylinder 3 and inturn activates the responsive switch 4 to drive the display device or some other control system to give a signal showing success of clamping.

Referring to FIG. 3, it is shown therein a state of the present invention expressing its failure in clamping an object, wherein, there is nothing in the clamp to be clamped, so that when the valve body 17 is pushed forward, the through hole 173 will reach the discharge port 162, air pressure supplied by the air supplying hole B goes along the air way 172 and is released out from the through hole 173 and the discharge port 162, the cylinder 3 will then be restored to its original state under reducing of air pressure which is to be smaller than the resistance of the spring 31, meantime, the responsive switch 4 turns off the display device to mean failure of clamping.

The effects and characteristics of the present invention are as follows:

1. The limited switch 4 of the present invention is not located in the mechanical arm 1 or the working space, it is far away from the inferior environment and therefore is good for reducing failure of the mechanical arm 1 and for maintaining or elongating life of the equipment. And the bad situation of the mechanical arm 1 used in an area of being subject to explosion, dirty, or damp is totally improved.
2. In the present invention, motion of the cylinder 3 is driven by an differential pressure between the supplying air pressure and the pressure of the spring 31 depending on whether an object 5 is successfully clamped, and this inturn make the limited switch 4 to turn on or off the display device, such action is fast and accurate.

Through real operation, availability of the present invention is found better than what it was expected, the present invention can also be largely produced.

Having thus described my novel invention, what I claim as new and desire to be secured by Letters Patent of the United States is:

1. A differential pressure detecting system including:
   an air supply,
   an electromagnetic valve for choosing a first air supplying hole or a second air supplying hole,
   a mechanical arm which is provided with a clamp and a housing,
   a movable link while in said housing for effecting "opening" or "closing" of said clamp,
   a piston room provided closely behind said housing for moving of a piston,
   a first inlet and a second inlet in said piston room, by air supplying of said first inlet or said second inlet, said piston being able of moving backward or forward,
   said system is characterized in that, in said housing of said mechanical arm:
      a passage is provided at the rear of said link of said clamp, a valve body is provided in said passage and is movable therein;
      the front part of said valve body is connected with said link, while the rear part of said valve body is provided axially with an air way, yet a through hole extending radially outwardly is provided on the end of said air way, said rear part of said valve body is connected with said piston and extended through said piston to allow communication between said passage and said piston room;
      from the vicinity of the central position of said passage of said housing, a discharge port communicating with the atmosphere is extended outwardly;
      said first air supplying hole is connected with said first inlet, and said second air supplying hole is connected with said second inlet and a cylinder, so that said piston can be moved leftward or rightward in said piston room by air flow supplied by said first air supplying hole or said second air supplying hole, the air flow also renders said valve body to move in said passage for activating said link to "open" or "close" said clamp.

2. A differential pressure detecting system as claimed in claim 1, it is further characterized in that, when it is to take an object (workpiece), said second air supplying hole supplies air pressure for said second inlet to push forward said piston, and inturn push forward said valve body to render said link to push forward said clamp to clamp said object, because of the thickness of said object, moving distance of said valve body is limited and is too short to render said through hole to reach said discharge port, said second air supplying hole always supplies constant air pressure, therefore, air pressure from said second air supplying hole moves said cylinder and inturn activates said responsive switch to drive a display device to give a signal showing success of clamping; if there is nothing in the clamp to be clamped, when said valve body is pushed forward, said through hole will reach said discharge port, air pressure supplied by said second air supplying hole goes along said air way and is released out from said through hole and said discharge port, said cylinder will then be restored to its original state under reducing of air pressure, meantime, said responsive switch turns off said display device to mean failure of clamping.

3. A differential pressure detecting system as claimed in claim 2, wherein said cylinder has an elastically restorable spring provided therein.

4. A differential pressure detecting system as claimed in claim 2, wherein said piston has at least a first oil seal.

5. A differential pressure detecting system as claimed in claim 2, wherein at least more than one second oil seals are provided respectively both sides of said through hole of said valve body.

6. A differential pressure detecting system as claimed in claim 2, wherein a third oil seal is provided on said valve body.

7. A differential pressure detecting system as claimed in claim 2, wherein a triggering rod is provided outside of said cylinder and is movable along with the arm of said cylinder, said triggering rod can activate said responsive switch.

8. A differential pressure detecting system as claimed in claim 2, wherein said responsive switch is a limited switch.

9. A differential pressure detecting system as claimed in claim 1, wherein said cylinder has an elastically restorable spring provided therein.

10. A differential pressure detecting system as claimed in claim 1, wherein said piston has at least a first oil seal.

11. A differential pressure detecting system as claimed in claim 1, wherein an annular groove is provided around the central position of said passage of said housing, a discharge port communicating with the atmosphere is extended from said annular groove.

12. A differential pressure detecting system as claimed in claim 1, wherein at least more than one second oil seals are provided respectively both sides of said through hole of said valve body.

13. A differential pressure detecting system as claimed in claim 1, wherein a third oil seal is provided on said valve body.

14. A differential pressure detecting system as claimed in claim 1, wherein a triggering rod is provided outside of said cylinder and is movable along with the arm of said cylinder, said triggering rod can activate said responsive switch.

15. A differential pressure detecting system as claimed in claim 1, wherein said responsive switch is a limited switch.

* * * * *